(12) United States Patent
Benitez et al.

(10) Patent No.: US 7,924,212 B2
(45) Date of Patent: Apr. 12, 2011

(54) METHOD FOR HUMAN ONLY ACTIVITY DETECTION BASED ON RADAR SIGNALS

(75) Inventors: Diego Benitez, Pittsburgh, PA (US); Zhaozhang Jin, Columbus, OH (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/538,516

(22) Filed: Aug. 10, 2009

(65) Prior Publication Data
US 2011/0032139 A1    Feb. 10, 2011

(51) Int. Cl.
*G01S 13/00*    (2006.01)
(52) U.S. Cl. ............. 342/28; 342/27; 342/192; 342/195
(58) Field of Classification Search ...................... 342/28
See application file for complete search history.

(56) References Cited

U.S. PATENT DOCUMENTS

| | | | |
|---|---|---|---|
| 5,760,687 A | | 6/1998 | Cousy |
| 2002/0169735 A1* | | 11/2002 | Kil et al. ................... 706/46 |
| 2008/0260239 A1* | | 10/2008 | Han et al. .................. 382/156 |
| 2009/0144053 A1* | | 6/2009 | Tamura et al. .............. 704/207 |
| 2009/0146869 A1* | | 6/2009 | Dwelly et al. .............. 342/193 |

FOREIGN PATENT DOCUMENTS
WO    2007073173 A1    6/2007
* cited by examiner

*Primary Examiner* — Thomas H Tarcza
*Assistant Examiner* — Timothy A Brainard
(74) *Attorney, Agent, or Firm* — Taft, Stettinius & Hollister, LLP; Keith J. Swedo

(57) ABSTRACT

A method of detecting human presence includes using a radar sensor to monitor a space, and receiving an output signal from the radar sensor. A Fourier transform is performed on the output signal to produce a signal spectrum. It is decided whether the output signal is indicative of human activity dependent upon at least one acoustic feature of the signal spectrum and at least one spectral feature of the signal spectrum.

20 Claims, 15 Drawing Sheets

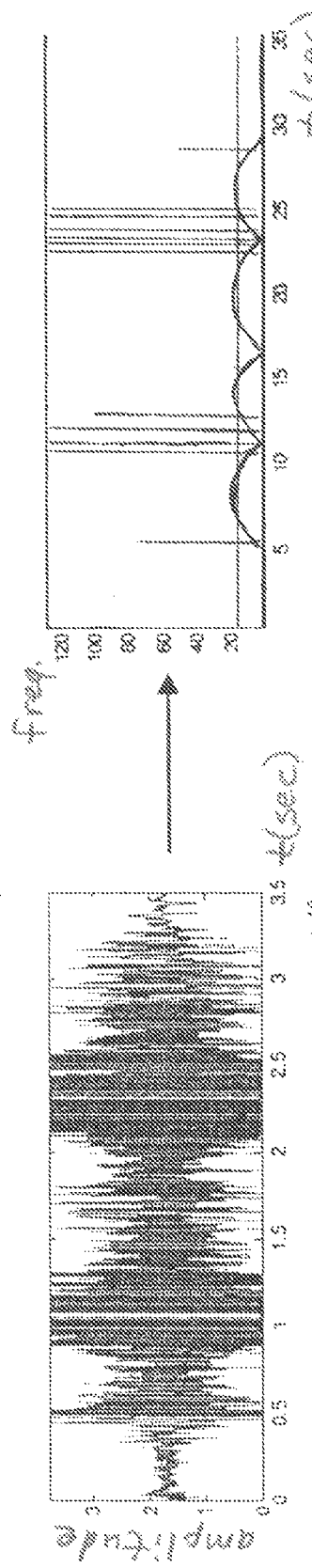
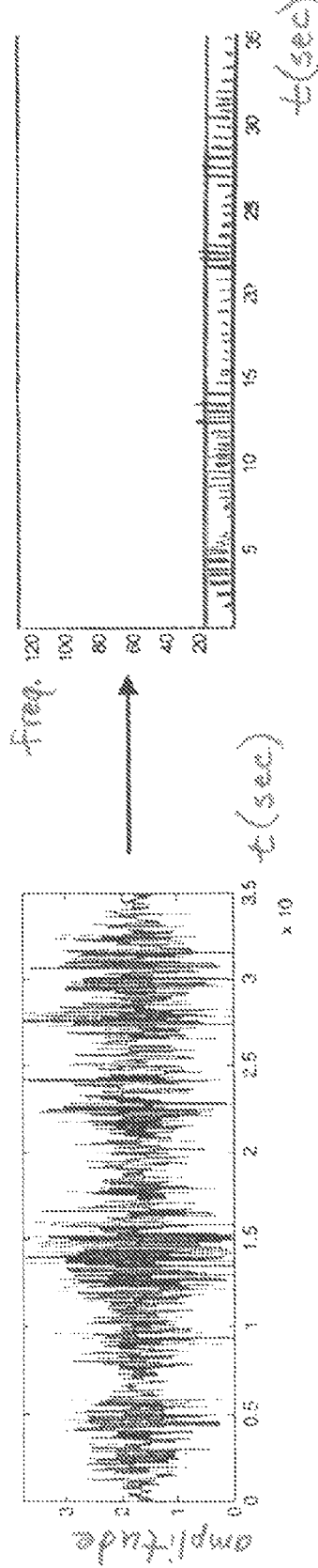
FIG. 3a
FIG. 3b
FIG. 3c
FIG. 3d

| Human Cases | Nonhuman Cases |
|---|---|
| Radial walking | Jeff's dog |
| Lateral walking | Rolling balls |
| Spiral walking | Vertical blinds |
| Slow walking | Coke cans |
| Fast walking | Radio car |
| Men walking | Dhananjay's car |
| Women walking | Ashish's iRobot |
| Crawling | Metal fan |
| Random movement | Trash can |

FIG. 11

METHOD FOR HUMAN ONLY ACTIVITY DETECTION BASED ON RADAR SIGNALS

BACKGROUND OF THE INVENTION

1. Field of the Invention

The present invention relates to surveillance systems, and, more particularly, to security systems that detect the presence of humans.

2. Description of the Related Art

Surveillance systems, also known as security systems, are known to include security devices, such as motion detectors, for sensing the presence of human activity. A problem with such motion detectors is that they are unable to discern between activity by humans and activity by pets or other moving objects like blinds or fans. Consequently, households that include pets may need to disable the motion detectors of their security systems in order to avoid false alarms.

Human-only detection (HoD) is an attempt to achieve robust detection of human activities while ignoring all other moving objects. It is a very challenging task mostly because such detection may call for some intelligence in the first place as to what characterizes human activities and what does not.

Some attempts at human activity detection have been based on the use of radar sensing technology. Radar has some obvious advantages in surveillance applications. Radar is inexpensive and easy to deploy on a large scale. In contrast to video cameras, radar may work covertly and can be functional continuously, 24/7, both days and nights. A disadvantage of radar, however, may be that its output is not so straightforward to visualize or translate into useful information.

In the current literature, the state-of-the-art method of radar based human detection involves modeling human activities. Specifically, an attempt is made to model each individual body part and its corresponding response in the radar signals and estimate the most likely activity being observed given the currently received signal. This type of approach is similar to the subsource fitting and yields reasonable performance as long as the human being detected is acting in a normal fashion, e.g., walking with a constant rate of arm swings. A problem may arise when an intruder tries to trick the system by acting in an unusual fashion. In such cases, the intruder's actions almost never match the ideal action model, and hence the system does not identify the intruder as being human. Moreover, it is not clear how such a system will perform if other activities occur, such as a pet walking around. Finally, known methods employ only a continuous wave (CW) type of radar.

What is needed in the art is a security sensor that can effectively discriminate between humans and non-human motion activity (e.g., pets).

SUMMARY OF THE INVENTION

The present invention provides a method of detecting human activity based on radar signals. The method of the invention may discriminate between human activity and other activity, rather than try to model human activity as does the prior art. Acoustic features that are observable in the radar signal may be used to discriminate between human activities and other activities, and thus may be used to detect human activities. An additional set of spectral features (e.g., spectral flatness, spectral kurtosis, etc.) may be combined together with the aforementioned acoustic features to constitute the feature space utilized by the invention. State-of-the-art machine learning approaches, for example multi-layer perceptron (MLP) neural nets and support vector machine (SVM), may be devised and trained individually to the system to tackle the human/nonhuman classification problem. Lastly, to achieve more robust detection, a frame-level joint decision strategy based on taking neighboring frames into account may significantly improve the rate of detection as well as a reduction in the occurrence of false alarms. The present invention may be embodied in many forms. For example, the present invention may be an embedded system such as software on a chip or implemented in any computer language such as by use of MATLAB, and then may deployed on LabVIEW for real-time experimentation. Quantitative results indicate that the method of the invention is very accurate in detecting human activity. Human-only detection, like other classification problems, may call for finding the most relevant features that can best represent the discrepancies between classes.

In one embodiment, radar of continuous wave (CW) type is employed in the present invention. However, it is also possible to employ conventional pulsed radar.

In one embodiment, a set of twenty-five dimensional features are extracted within each time frame, and differences between human and nonhuman activities are identified in this feature space. Machine learning techniques such as Multi-layer perceptron (MLP) and support vector machine (SVM) may be trained and devised individually to the system. To achieve more robust detection, frame-level decisions may be made by taking neighboring frames into account.

The invention comprises, in one form thereof, a method of detecting human presence includes using a radar sensor to monitor a space, and receiving an output signal from the radar sensor. A Fourier transform is performed on the output signal to produce a signal spectrum. It is decided whether the output signal is indicative of human activity dependent upon at least one acoustic feature of the signal spectrum and at least one spectral feature of the signal spectrum.

The invention comprises, in another form thereof, a method of detecting human presence, including using a radar sensor to monitor a space, and receiving an output signal from the radar sensor. A Fourier transform is performed on the output signal to produce a signal spectrum. A plurality of features are extracted from the signal spectrum. The features are passed through a classifier, and the classifier is used to decide whether the output signal is indicative of human activity.

The invention comprises, in yet another form thereof, a method of detecting human presence, including using a radar sensor to monitor a space, and receiving an output signal from the radar sensor. A series of frames is produced based on the radar sensor output signal. Each of the frames overlaps at least one adjacent frame with respect to time. A discrete-time short-time Fourier transform is performed on at least one of the frames to produce a signal spectrum. The power spectrum signal is mapped into a plurality of acoustic features by use of triangular mapping windows. A discriminative model is trained as a classifier. The acoustic features and a plurality of spectral features of the signal spectrum are passed through the classifier. The classifier is used to decide whether the output signal is indicative of human activity.

An advantage of the present invention is that the discriminative classifiers employed are more effective than generative models which model human activity rather than discriminate human activity.

Another advantage is that the present invention is able to detect humans substantially exclusively, and thus is substantially immune from false alarm sources, such as pets, fans, etc.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3a is a plot of example output amplitudes of a radar detector versus time when sensing the movements of a human.

FIG. 3b is a plot of example output amplitudes of a radar detector versus time when sensing the movements of a dog.

FIG. 3c is a plot of example output frequencies of a radar detector versus time when sensing the movements of a human.

FIG. 3d is a plot of example output frequencies of a radar detector versus time when sensing the movements of a dog.

FIG. 11 is a table of two sets of user cases for which data may be collected according to a data acquisition process.

Figure 1:
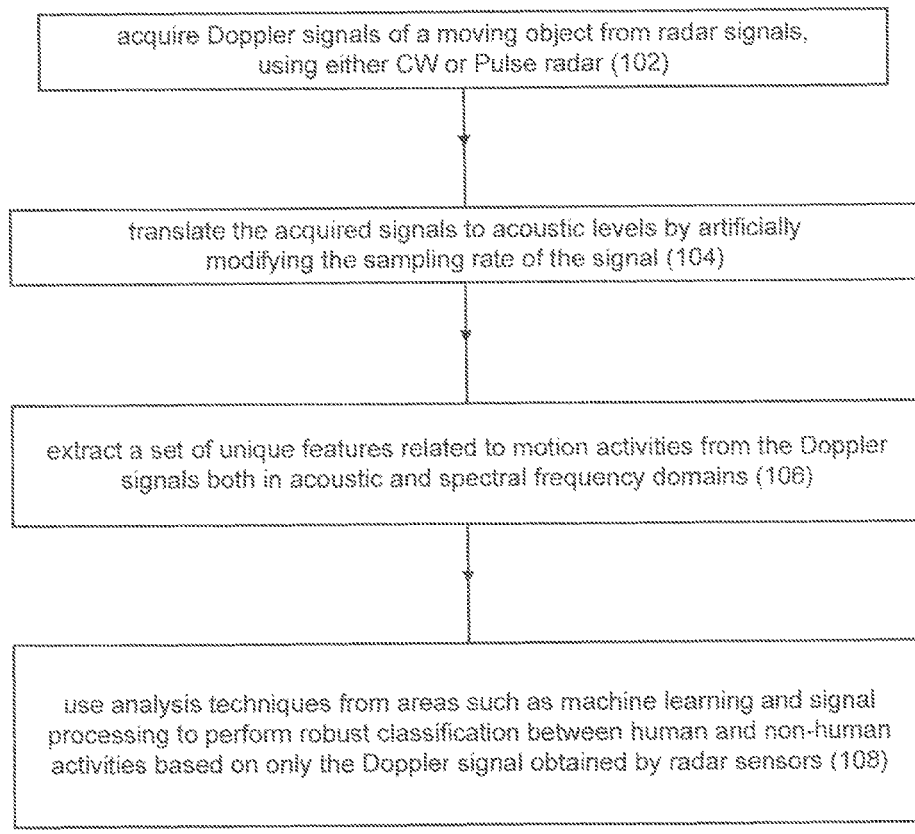
FIG. 1 is a flow chart of one embodiment of a human detection method of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings and particularly to FIG. 1, there is shown one embodiment of a human detection method 100 of the present invention. In a first step 102, Doppler signals of a moving object are acquired from a radar signal, using either continuous wave radar or pulse radar. For example, a radar sensor may be installed in a room of a building to be monitored. Rebounded Doppler signals may be received from a human intruder walking through the monitored room.

In a second step 104, the acquired signal is then translated to acoustic levels by artificially modifying the sampling rate of the signal. That is, the sampling rate may be selected such that components of the sampled signal are within the frequency range that human beings are capable of hearing.

Next, in step 106, a set of "unique features" related to or indicative of motion activity are extracted from the Doppler signal both in the acoustic and spectral frequency domains. As described in detail hereinbelow, at least nineteen features indicative of motion may be extracted from the Doppler signal in the acoustic domain, and six additional features indicative of motion may be extracted from the Doppler signal in the spectral frequency domain. It is to be understood that this embodiment including nineteen features in the acoustic domain and six features in the spectral frequency domain is merely an example. Additional features may be extracted from the Doppler signal in either or both of the acoustic domain and the spectral frequency domain.

In a final step 108, the system uses analysis techniques from areas such as machine learning and signal processing to perform robust classification between human and non-human activities based on only the Doppler signal obtained by one or more radar sensors. For example, an electronic processor may determine whether a digitized version of the Doppler signal includes enough of the nineteen features in the acoustic domain and the six features in the spectral frequency domain to determine that the Doppler signal is a result of human activity.

Figure 2:
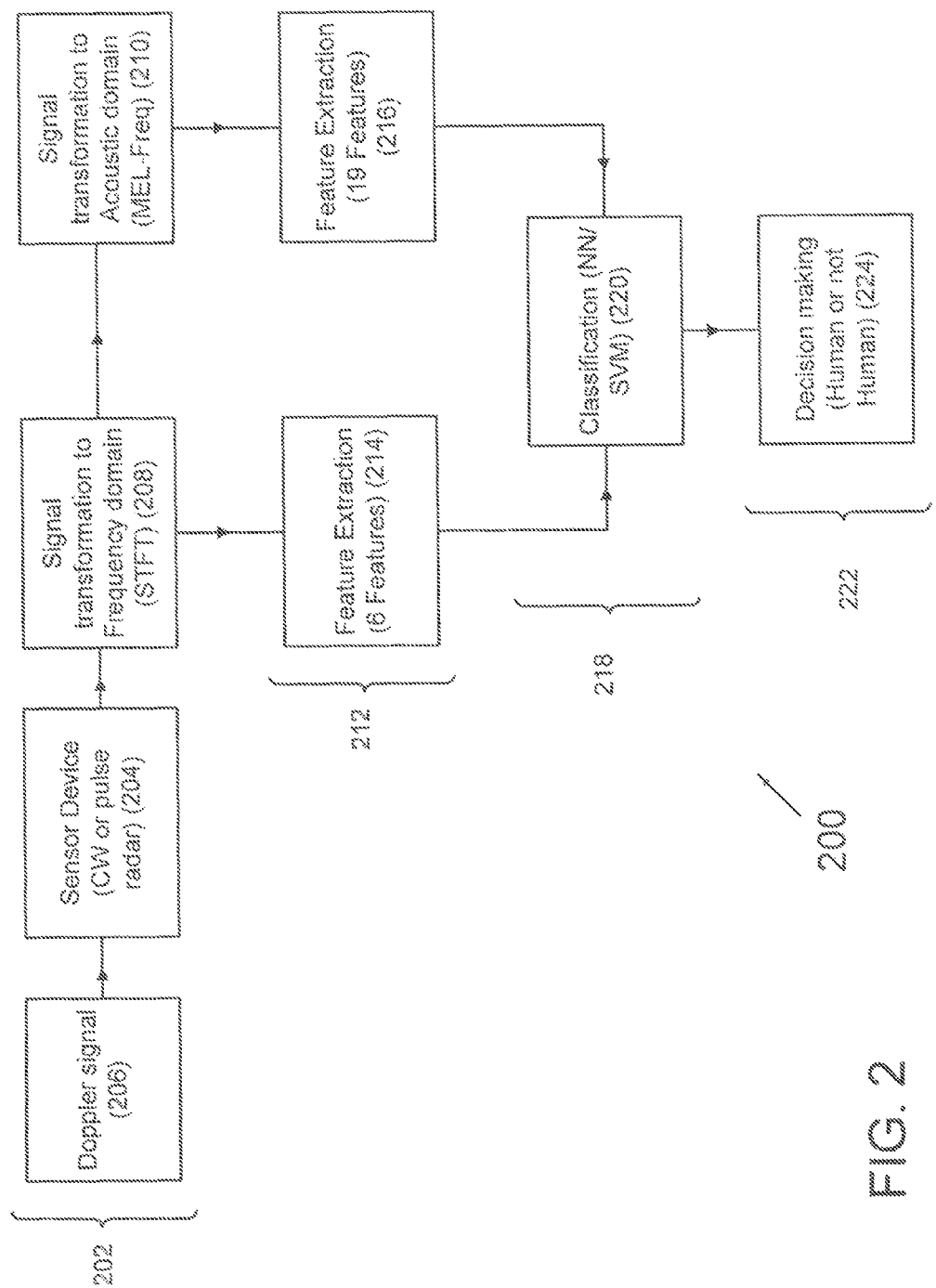
FIG. 2 is a block diagram of one embodiment of a human detection system of the present invention.

One embodiment of a human detection security system 200 of the present invention is shown in FIG. 2. Security system 200 may be provided for a structure, such as a building. However, system 200 may also be used to secure other spaces, such as outdoor areas, subterranean rooms and passages, and zones of air space. System 200 includes an acquisition stage 202 having a sensor device 204 for receiving a Doppler signal 206. Sensor device 204 may be capable of detecting either CW or pulse radar. Sensor device 204 may capture Doppler signal 206 as the Doppler signal comes from a moving target. This signal is then acquired and sampled by using a data acquisition device, which translates the analog Doppler signal to the digital domain. This signal is then communicated and input to the Analyzer sub-system, which processes the measurement, and extracts relevant features from the data and then determines whether the moving target corresponds to human activity or not.

Acquisition stage 202 also includes a signal transformation block 208 for transforming the received Doppler signal 206 into the frequency domain, such as via a short time Fourier transform (STFT). Acquisition stage 202 further includes a signal transformation block 210 for transforming the frequency domain signal from block 208 into the acoustic domain, such as via a Mel-frequency cepstrum.

A good set of features may contribute heavily to the success of discriminating between human and non-human activities. A feature extraction stage 212 includes a block 214 for extracting the six features that characterize human activity in the frequency domain. Feature extraction stage 212 also includes a block 216 for extracting the nineteen features that characterize human activity in the acoustic domain.

A classification stage 218 includes block 220 that may use neural networks (NN) and/or support vector machines (SVM). A decision making stage 222 includes a block 224 that decides whether the activity is human or non-human.

With regard to a radar signal as audio (e.g., sound waves), human hearing is capable of discerning between human and non-human activities. In other words, our ears can tell radar signals from human and non-human activities apart. Thus, ideas from other disciplines (e.g., audiology and psychoacoustics) can be borrowed for use in the classification task. In fact, when visualizing the radar signal in the time-frequency domain, significant differences between human and non-human activities can be observed, as in FIGS. 3a and 3b, which are raw output of the radar sensor. The plot of FIG. 3a is due to human activity, and the plot of FIG. 3b is due to the non-human activity of a dog. Striking differences between the plots of FIGS. 3a and 3b may be observed.

FIGS. 3c and 3d are frequency-as-a-function-of-time representations, e.g., spectrograms, of FIGS. 3a and 3b, respectively. The plots of FIGS. 3c and 3d may be obtained by performing short-time Fourier transform (STFT) on the time domain signals of FIGS. 3a and 3b, respectively. In one embodiment, the window length may be set to 200 samples, with a 100 sample overlap. Given a signal sampling frequency of 2 kHz, the window length may be expressed as 0.1 second, and the overlap may be expressed as 0.05 second. Fourier transforms on overlapping frames is sometimes referred to as a Discrete-time STFT. The spectral frequency plots of FIGS. 3c and 3d may have a greater degree of difference between them than do the time domain plots of FIGS. 3a and 3b. With this being the case, spectral analysis may be the better representation and the better basis for feature extraction. In addition, psychoacoustic study may provide clues on how to extract effective acoustic/perceptual features. It is to be understood that the plots of FIGS. 3c and 3d may be three-dimensional plots in the sense that different colors or a third axis may be used to indicate the intensity or amplitude at each set of frequency-time coordinates.

Figure 4A:
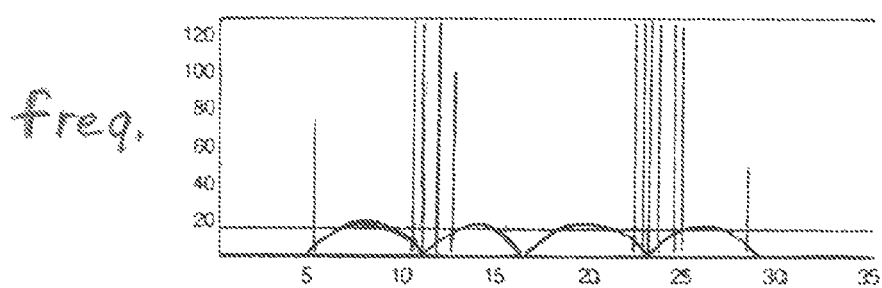
FIG. 4a is a power spectrum plot of example output frequencies of a radar detector versus time when sensing the movements of a human as in one embodiment of a feature extraction method of the invention.
Figure 4B:
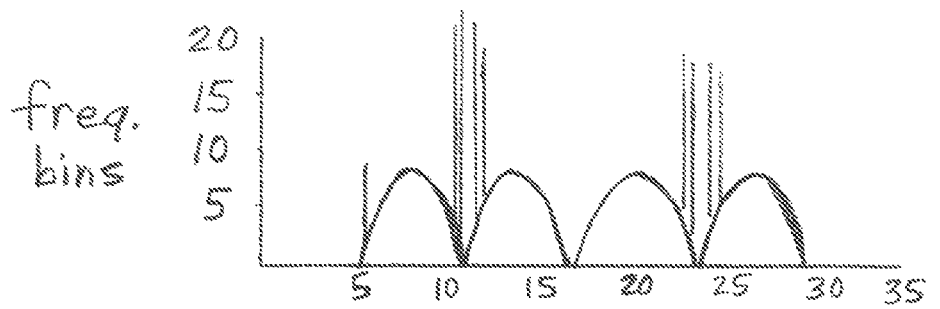
FIG. 4b is a mel scaled power spectrum plot as in one embodiment of a feature extraction method of the invention.

One embodiment of a feature extraction procedure of the invention is depicted in FIGS. 4a-b. Similarly to the plot of FIG. 3c, the power spectrum plot of FIG. 4a may be obtained by performing STFT, taking the Fourier transform of a windowed signal from radar output. As described above, the window length may be 200 samples with an overlap of 100 samples.

Figure 5:
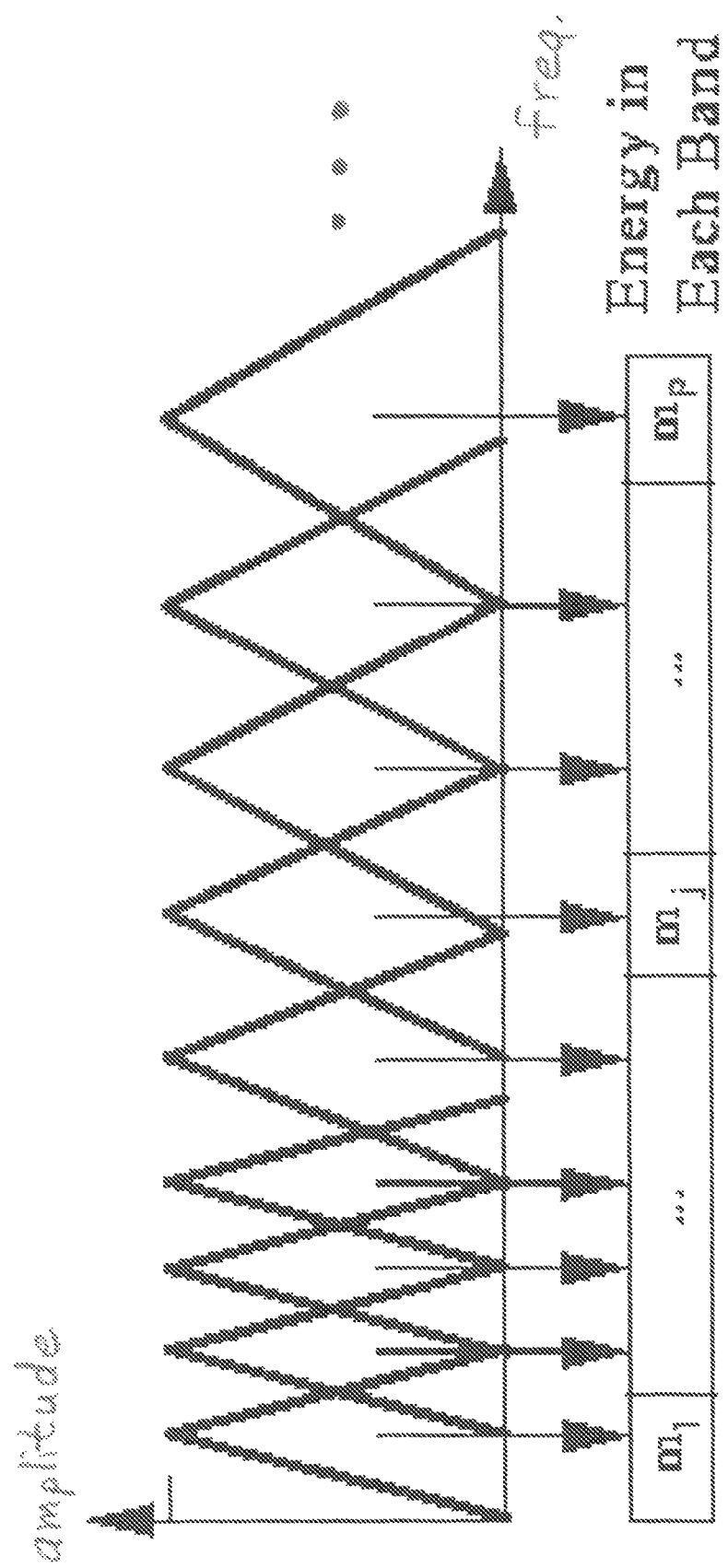
FIG. 5 is a plot of a triangular Mel-scale filterbank being applied to a plot of amplitude versus frequency according to one embodiment of the invention.

The mel-scaled power spectrum plot of FIG. 4b may be obtained by mapping the powers of the spectrum obtained from FIG. 4a onto the Mel scale, using triangular overlapping windows on the frequency axis. Such mapping onto the Mel scale is illustrated in FIG. 5. More particularly, a triangular filterbank that is equally spaced on the mel-frequency scale is provided. The spacing may be 150 mels, and the bandwidth may be 300 mels. Mel-to-Hz conversions may be defined by frequency=700(exp(mel/1127.01048)−1). Thus, the first channel ranges from 0 Hz to 336 Hz; the second channel ranges from 294 Hz to 384 Hz, and so on. Overlapping triangles may be used in order to reduce artifacts at the boundaries. Energy in each of nineteen of twenty frequency bands or frequency bins (except for the DC component, which is removed) in Mel-frequency may be determined, resulting in a power spectrum of nineteen spectral features. This process may mimic a perceptual scale of pitches by human listeners.

Concretely, the Mel scale produces high resolution in the low frequency regions, while compressing the high frequency regions. As a result, the feature dimension may be reduced from 129 features in FIG. 4a to twenty features in FIG. 4b. Thus, acoustic features may be extracted by first taking the Fourier transform of a windowed excerpt of the radar signal with a window length of 200 samples and an overlap of 100 samples. Second, triangular overlapping filters may be used to map the power spectrum onto the Mel scale, and the first dimension may then be removed as it is constant (the DC component).

In addition to the nineteen dimensional acoustic features discussed above, another set of spectral features may be determined. This second set of features may tend to enhance the discriminating ability of the first set of nineteen features. In one embodiment, there are six additional features, including spectral flux, spectral flatness, normalized energy, spectral centroid, spectral kurtosis, and spectral bandwidth.

As described above, twenty-five features may be extracted for the human/nonhuman classification task, including nineteen acoustic features and six spectral features. These features may then be fed into a classifier, as described below.

Human-only detection may be regarded as a classification task for determining whether a moving object is human (class 1) or nonhuman (class 0). In this reformulation, machine learning techniques can be used to build classifiers to fulfill the task. For example, neural networks (NN) and support vector machines (SVM) may be employed.

Figure 6:
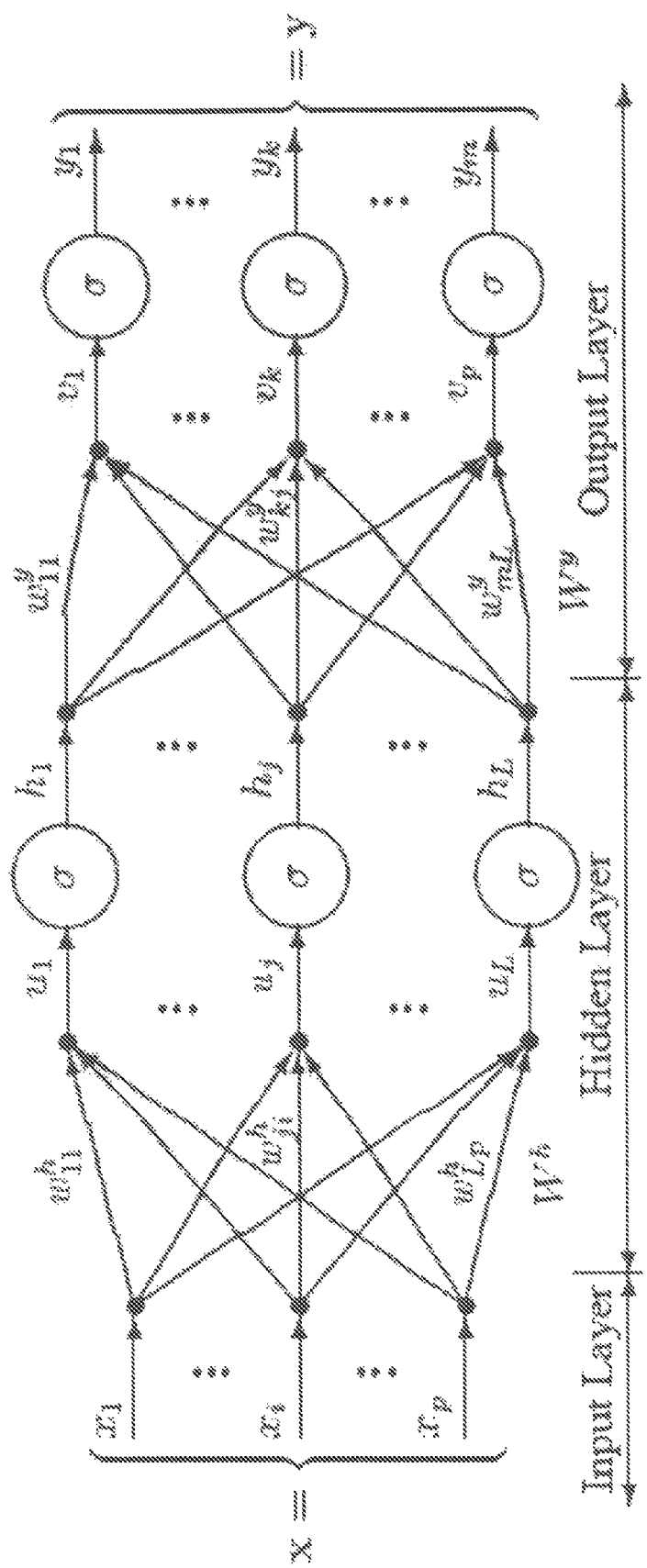
FIG. 6 is a diagram illustrating the topology of multi-layer perceptron with an input layer, a hidden layer, and an output layer according to one embodiment of the present invention.

Two systems may be developed, using MLP and SVM respectively. MLP is a feedforward neural network that has a structure as shown in FIG. 6. In this particular task, the feedforward neural network may have a structure that has twenty-five input nodes, fifty hidden nodes, and one output node. The size of the input layer and the output layer may be problem-dependent, and thus the size of the input layer and the output layer may not be changed. For example, in one embodiment there are twenty-five features, and thus the number of input nodes may be set to twenty-five. Because the task may be to classify, only one binary output of "0" or "1" may be called for, and thus the size of the output layer may be set to one node. However, the size of the hidden layer may not be explicitly defined and it may play an important role in the behavior of the model. An issue is, if the hidden nodes are too few, then the model may not solve the problem well (e.g., low accuracy), but if there are too many hidden nodes, the model may over-fit the training data and lose the ability to generalize. Therefore, deciding the number of hidden nodes may involve finding a tradeoff point. Here, a cross-validation technique may be used to select fifty as the number of hidden nodes to optimize the tradeoff. The transfer function used in each hidden node may be a tangent hyperbolic. One possible training method that may be used is Levenberg-Marquardt back-propagation, which is referred to as "trainlm" in MATLAB.

Figure 7:
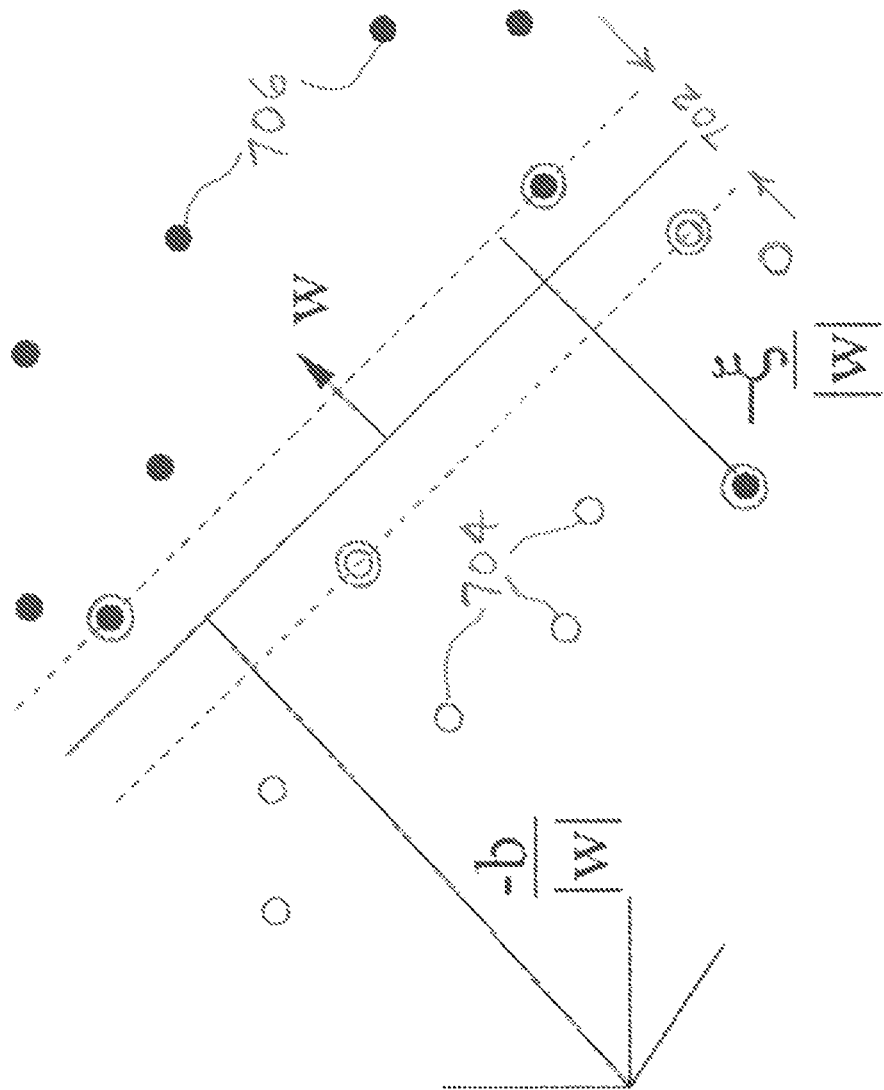
FIG. 7 is a support vector machine plot according to one embodiment of the present invention.

SVM is another type of discriminative model that may be trained as a classifier. An advantage of SVM may lie in its maximum margin property. SVM attempts to maximize the margin of two classes, thereby making it easier to generalize toward unforeseen test data. In the simple two-dimensional support vector machine diagram of FIG. 7, the margin of two classes may be represented by a distance 702 between the two dashed lines, wherein elements of one class are represented by circles 704, and elements of the other class are represented by dots 706 (i.e., filled-in circles). In one embodiment, radial basis function (RBF) may be chosen as a kernel method, which virtually extends the feature space into infinite dimensions. RBF width may be set to 0.2 and slack may be set to 1 (for soft margin classifier). Like the number of hidden nodes in MLP, these two parameters here may affect SVM performance.

Once a classifier (either MLP/NN or SVM) is properly trained, it can be applied to label unforeseen data at the frame level. In a real time application, the system may take a windowed slice of radar signal as the input, and extract therefrom the corresponding twenty-five dimensional features. The system may then pass the twenty-five dimensional features through the classifier, and then output a label for that frame (human/nonhuman, or 1/0).

Figure 8:
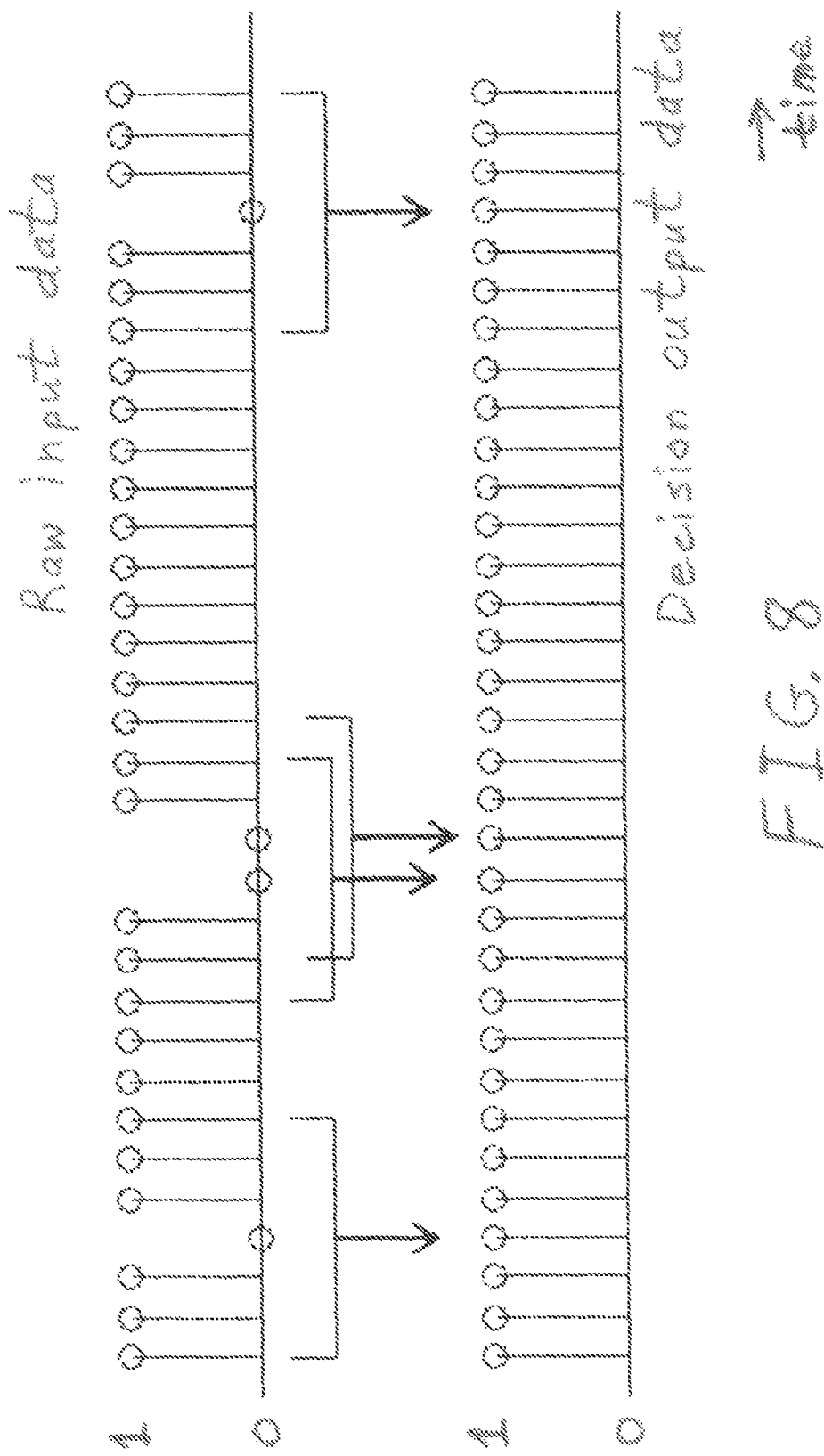
FIG. 8 is a diagram illustrating one embodiment of a decision-making process of the present invention.

The above-described process embodiment provides a basic way of making decisions of whether movement is caused by a human or nonhuman source. However, the reliability of this method may suffer in the event that one frame is too short and error-prone. Thus, another embodiment of the invention provides another process for robust detection of human presence. Particularly, information from neighboring frames may be incorporated in making joint decisions. A specific embodiment of this process is illustrated in FIG. 8, wherein the top diagram represents a stream of binary raw input data, with "1" indicating a human source, and "0" indicating a nonhuman source. The bottom diagram of FIG. 8 represents a stream of binary decision output data, which may be considered a moving average (or median filter) of the raw input data. In the specific embodiment depicted in FIG. 8, each frame of decision output data may be a binary moving average of a corresponding set of seven consecutive frames in the raw input data. Thus, instead of looking at just a single frame, a number of preceding frames and a number of succeeding frames are also considered in jointly deciding whether the frame in question is associated with human or nonhuman activity. In such a way, sporadic errors can be absorbed and the error rate can be greatly reduced.

The selection of the decision length (i.e., how many neighboring frames to consider) may affect the level of detection performance. Thus, when choosing the decision length, there may be tradeoff between robustness and resolution. In other words, if the decision length is too long, then the detection process may correct more errors, but the resolution (or sensitivity) may be reduced at the same time.

Figure 9:
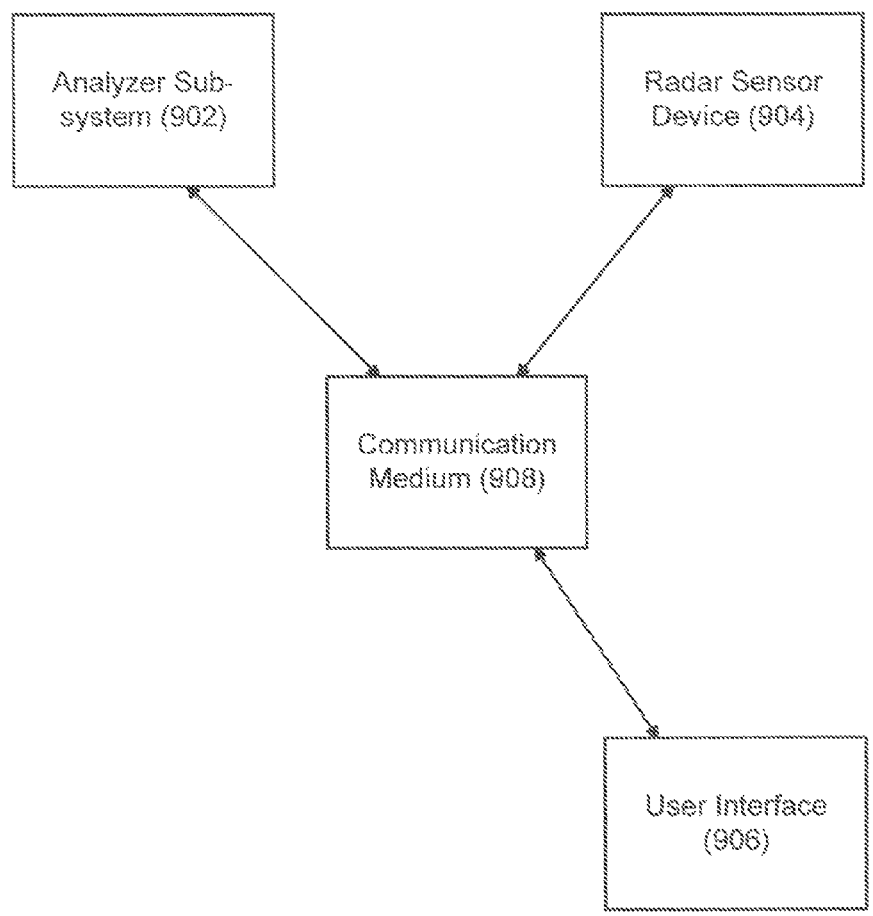
FIG. 9 is a block diagram of one embodiment of a human detection system of the present invention.

A human detection system 900 of the present invention illustrated in FIG. 9 may include an analyzer sub-system 902, a radar sensor device 904, a user interface 906, and a communication medium 908. Analyzer sub-system 902, which may include an electronic processor, may physically reside either next to the radar sensor device 904 (or the sensor may be a part of the analyzer sub-system), or the analyzer sub-system may reside at some other location. The analyzer sub-system may analyze and report information regarding device use, performance, energy consumption, use trends, costs, etc. to a user interface 906, which may be either a user interface device in the building, a personal mobile phone device, or a web interface. Communication between analyzer sub-system 902 and user interface 906 (and/or between analyzer sub-system 902 and sensor device 904 if not part of the same unit) may take place via communication medium 908, which may be in the form of power line communication, wireless communication, or some other direct medium such as Ethernet or coaxial cable, for example.

Figure 10A:
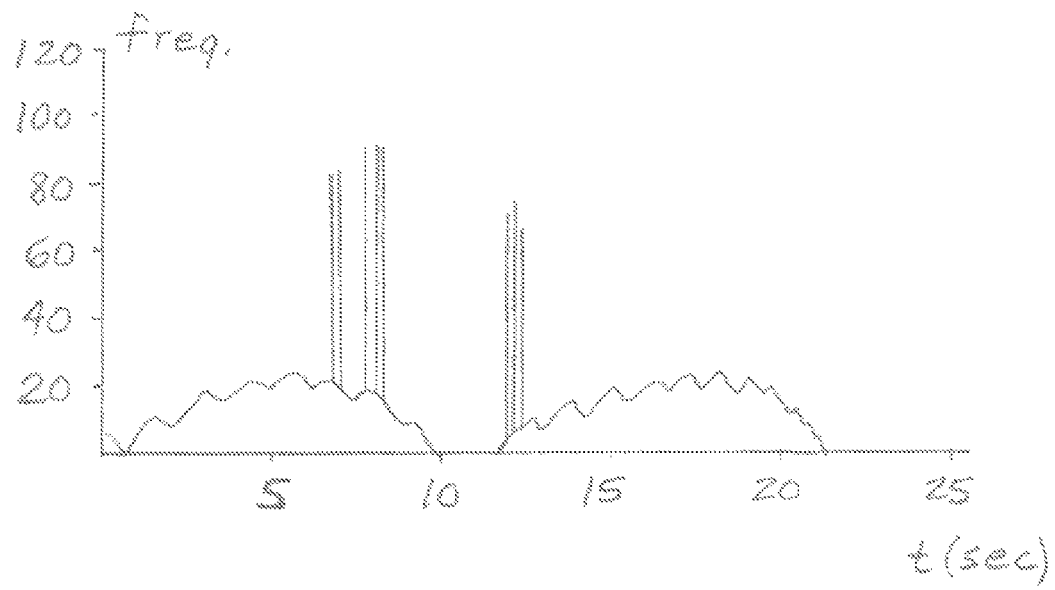
FIG. 10a is an example frequency versus time plot of the output of a continuous wave (CW) radar sensor when sensing a human walking.
Figure 10B:
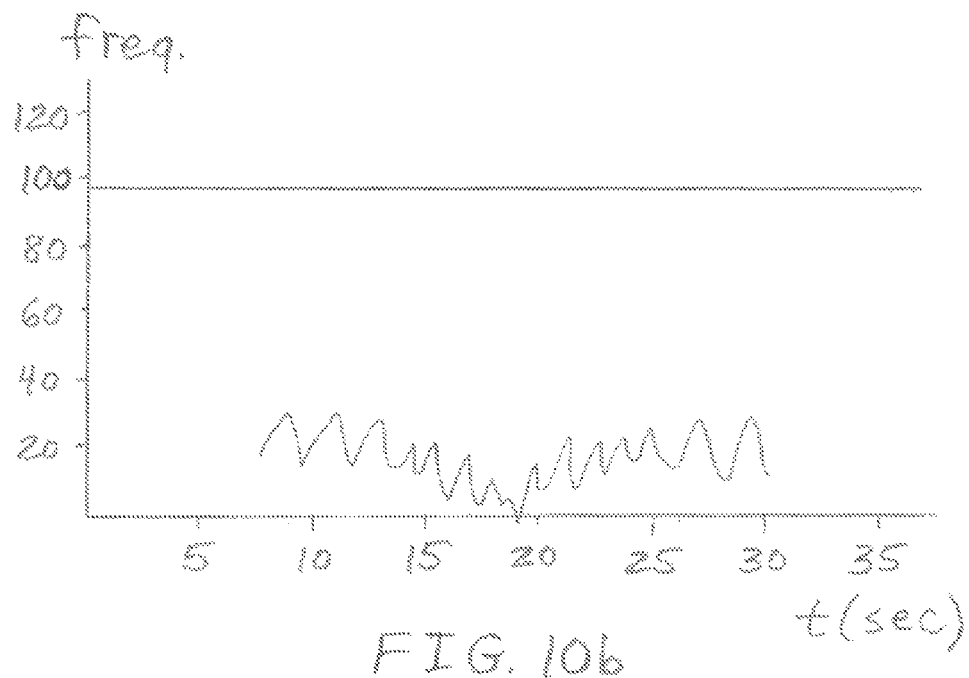
FIG. 10b is another example frequency versus time plot of the output of a continuous wave (CW) radar sensor when sensing a human walking.

FIGS. 10a and 10b are example frequency vs. time plots of the output of two different CW radar sensors when sensing a human walking. In one data acquisition experiment, two sets of user cases may be constructed as shown in FIG. 11, one for human activities, and the other for nonhuman activities. The radar output sampling frequency may be set to 2 kHz for both channels, although eventually only the first channel may be used for detection. Each case may be performed and data associated therewith may be recorded into .txt files. In total, in one experiment, 29,383 frames of data were acquired for human activity (class 1) and 34,223 frames of data were acquired for nonhuman activity (class 0). This data size may be considered adequate for training given the feature dimension.

The training process may call for true human/nonhuman labels. Thus, a semi-manual labeling may be performed. When recording data, what happens in a certain range of time may be largely known. For example, it may be known that human activities occur during a certain time period of recording. Thus, all frames may be labeled as human in this period of time once energy surpasses a certain threshold.

Figure 12:
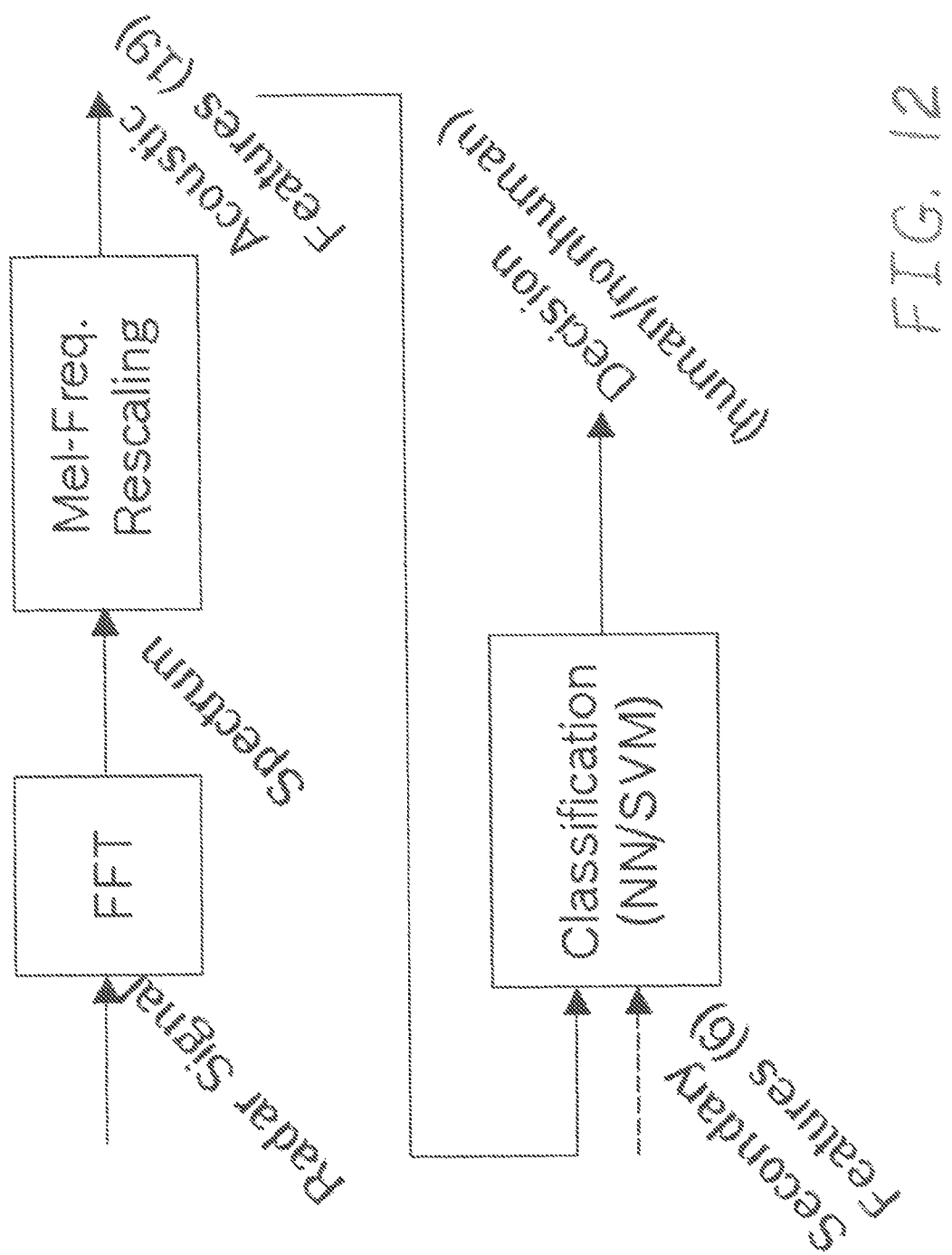
FIG. 12 is a flow chart of one embodiment of a method of the present invention including feature extraction, classification, and decision making.

Given features and true labels as a pair, classifiers can be taught to establish such a mapping. As discussed above with regard to classification, MLP and SVM can be trained in similar ways. The dataset may be randomly split into training and test. The training set may have 23,853 frames for both classes, and the remainder of the data may be used for test. The use of an equal number of data instances in both classes may inhibit the classifier from biasing to either class due to unequal class priors. Training may take some period of time (e.g., a matter of hours), but testing may be performed in real time. Thus, the whole process, including feature extraction, classification and decision making, may take no longer than 0.05 second (1/frame rate). This process is discussed above stage-by-stage, and a flow chart of the process is illustrated in FIG. 12. MLP may perform faster than SVM because the size of the MLP hidden layer may be fixed at 50, while SVM decides its own support vectors during training and there may number in the thousands.

There may be two sets of results, one for MLP and one for SVM. For comparison, they are presented together in FIG. 13. Each of MLP and SVM has three curves, representing overall accuracy, human detection rate and nonhuman detection rate. Each of overall accuracy, human detection rate and nonhuman detection rate may be thought of as one minus the rate of errors. The x-axis represents the decision time length in seconds, as discussed above, and the y-axis represents the accuracy percentage.

Figure 13:
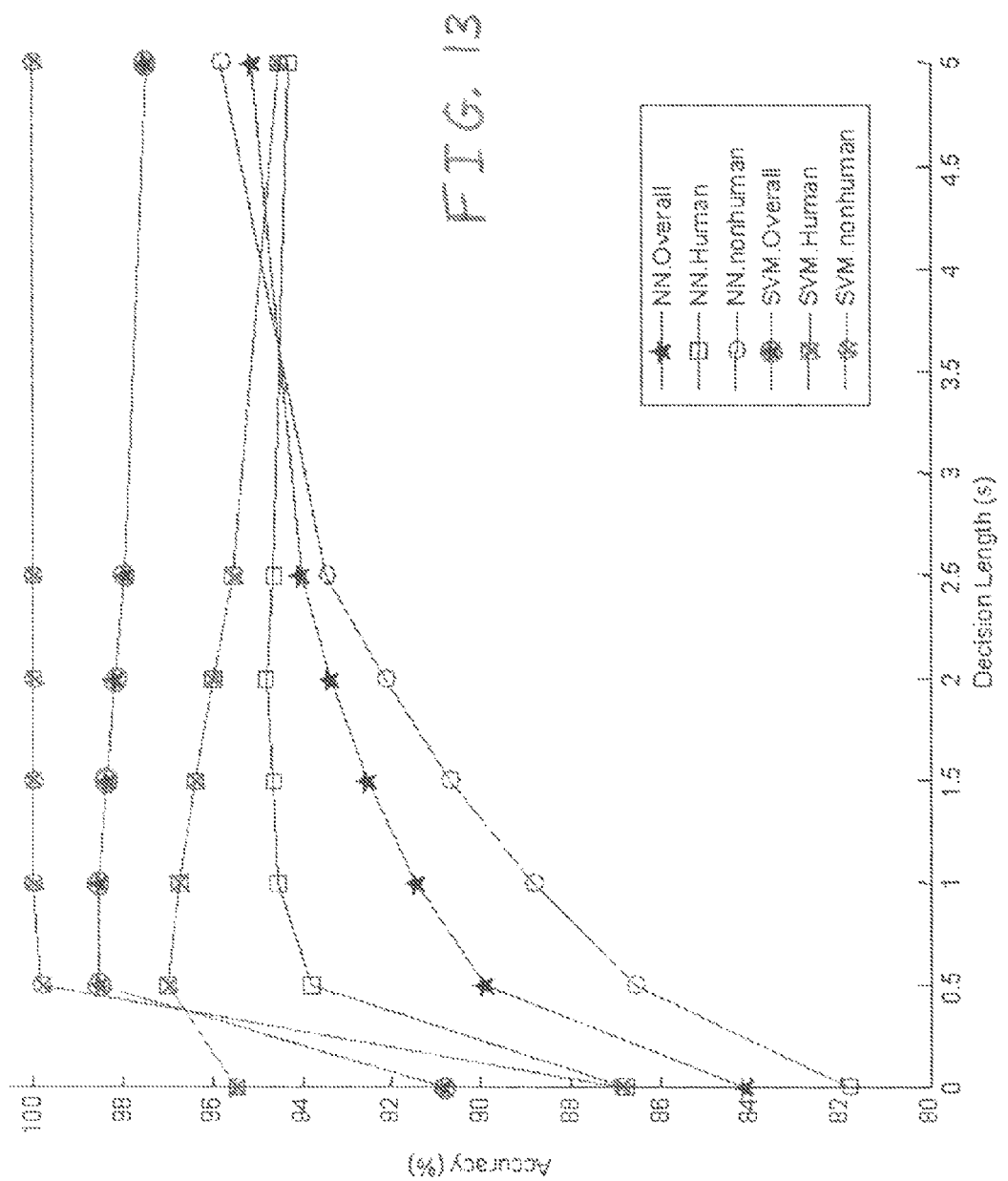
FIG. 13 is a set of plots comparing MLP and SVM with respect to human detection performance.

As illustrated in FIG. 13, SVM may perform better than MLP in almost all conditions. At the frame level, with the decision length equal to zero, SVM outperforms MLP by 7% (91% versus 84%). In the SVM model, a decision length of 0.5 second appears to be the optimal choice. With decision lengths greater than 0.5 second, the accuracy of SVM may decrease because resolution is lost rather than more errors being absorbed. With a decision length of 0.5 second, SVM may perform at an overall accuracy of 98.5% and the rate of false alarms is close to zero.

Figure 14:
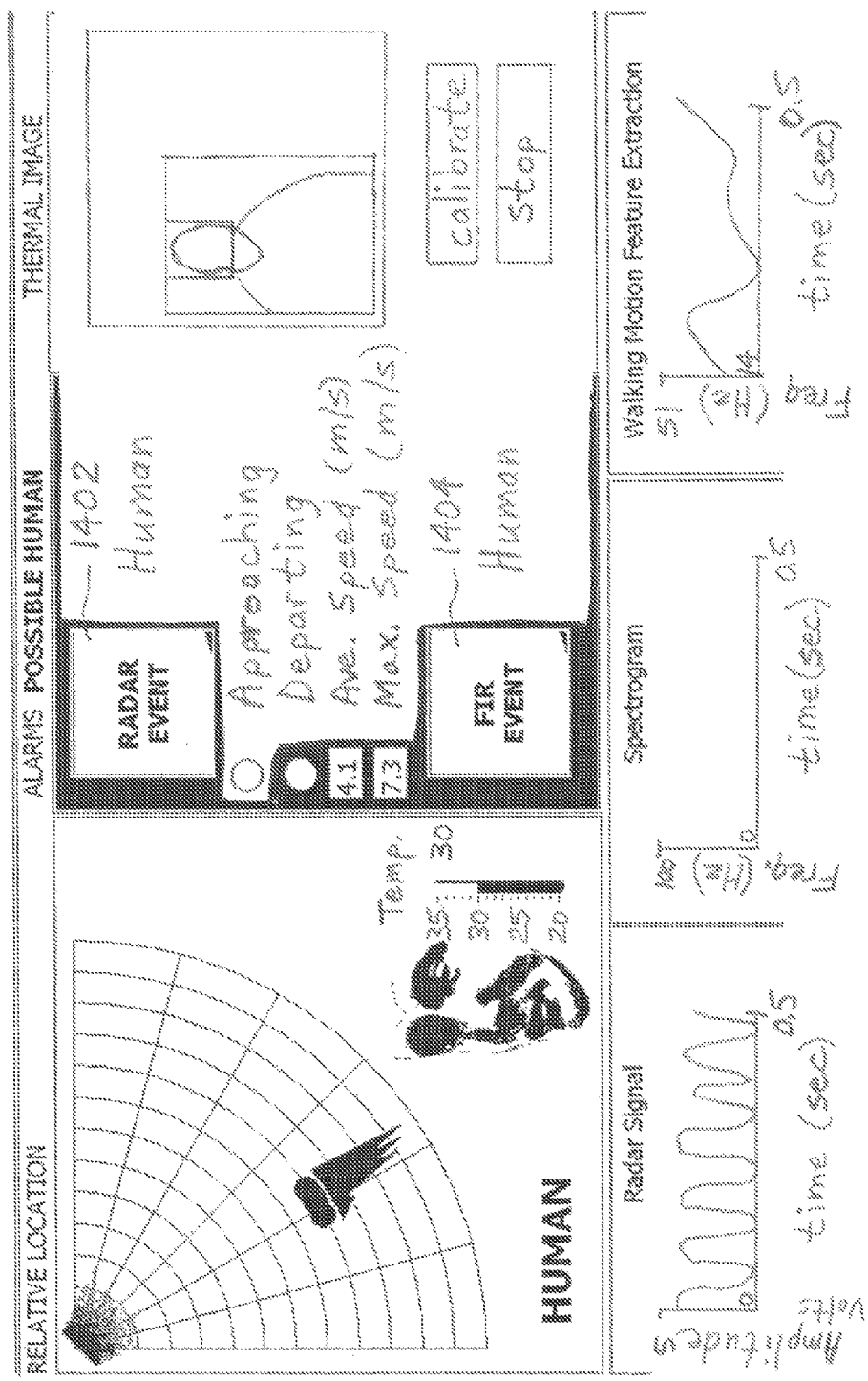
FIG. 14 is one embodiment of a user interface of a human-only detection system of the present invention.

The previously described experiment may be based on collected data. In other words, the experiment is offline. To implement the system in real time, a simulation may be built in LabView, and MATLAB code may be executed as a remote function call. One embodiment of a user interface for a human-only detection system of the invention is illustrated in FIG. 14 with some additional features for future add-ons. In essence, a radar event light 1402 and a far infrared (FIR) event light 1404 may be the outputs of the detection process of the human-only detection system.

In one embodiment, the invention includes a multi-sensor security system for human-only detection. The multi-sensor security system may integrate a standard continuous or pulse radar sensor and a low-resolution thermal FIR-array camera. Radar with no angular resolution may work well when the target is approaching the sensor unit in a radial direction, but may work poorly when objects approach in a lateral direction. In contrast, the FIR-array may work poorly when the target is approaching the sensor unit in a radial direction, but may work well when objects approach in a lateral direction. Thus, by combining both types of sensors in a single detection system and fusing the two sensor signals together for the analysis, it is possible to achieve superior human presence detection performance. The methods described herein may be used to process and perform the classification for the radar-based portion of such a complementary sensor system. The overall classification performance of the system may be improved by combining both sensor signals.

One or both of lights 1402, 1404 being ON may indicate that human activity has been detected, and both of lights 1402, 1404 being OFF may indicate that human activity has not been detected. An input buffer may store 0.5 second of the radar signal and may then throw a decision (e.g., may cause lights 1402, 1404 to be ON or OFF). Decisions may be delayed until a few future frames are read. In one embodiment, there is a 0.25 second delay, which may be acceptable in the current task.

The present invention may provide novel features for a radar signal. Although acoustic features may be used in speech and audio processing, it may not be quite straightforward to extract them from a radar signal. However, by playing the radar signal about ten times faster than real time, and thereby shifting the radar signal's frequency components into the audible range, it may be possible to recognize human activity by use of human hearing. That is, a speeded up radar signal affected by human activity may sound different than a speeded up radar signal that is not produced from human activity. Speech/audio recognition technology may be used to determine whether the human ear is capable of discerning human activity in the radar signal. Also, a machine may be taught to recognize human activity by identifying certain features in a radar signal.

Another novel aspect of the invention involves training a classifier. MLP and SVM, which may be directed to the boundary, may be more effective than a Gaussian mixture model (GMM), which attempts to model the distribution within each class. In a Bayesian framework, GMM estimates likelihood while MLP/SVM calculates posteriori. However, the features may not nicely distribute (due to two different sources of features), and thus discriminative models may outperform generative models. Further, SVM may perform better than MLP due to the two classes having a wide region for plausible boundaries, and a boundary from SVM may be better than a boundary from MLP.

Yet another novel aspect of the invention may be the joint decision-making strategy. The effectiveness of this strategy may be evidenced in FIG. 13 by the improvement in decision accuracy with increasing decision time length. As discussed above, reasons for the improvement may include that a single frame is too short to make robust decisions, and some context is helpful in building confidence. However, a lot of context is not needed, and a decision that is slightly delayed may still be regarded as real time.

One common problem associated with machine learning is in regard to generalizing. That is, if training cannot cover all user cases, then the system may either fail to detect or may falsely issue an alarm. Thus, careful and comprehensive work may be called for to build a large training set. Another advantage of a large training set of data may be that it is beneficial in the learning of a competent model. This may be especially true for SVM.

The present invention may provide a machine learning approach for human-only detection using a continuous wave or pulse radar sensor. Acoustic and spectral features may be developed and may be largely effective for discriminating between human and nonhuman activities. MLP and SVM may be trained and devised to classify these activities. A decision making stage may incorporate classification results from neighboring frames into a robust decision.

Figure 15:
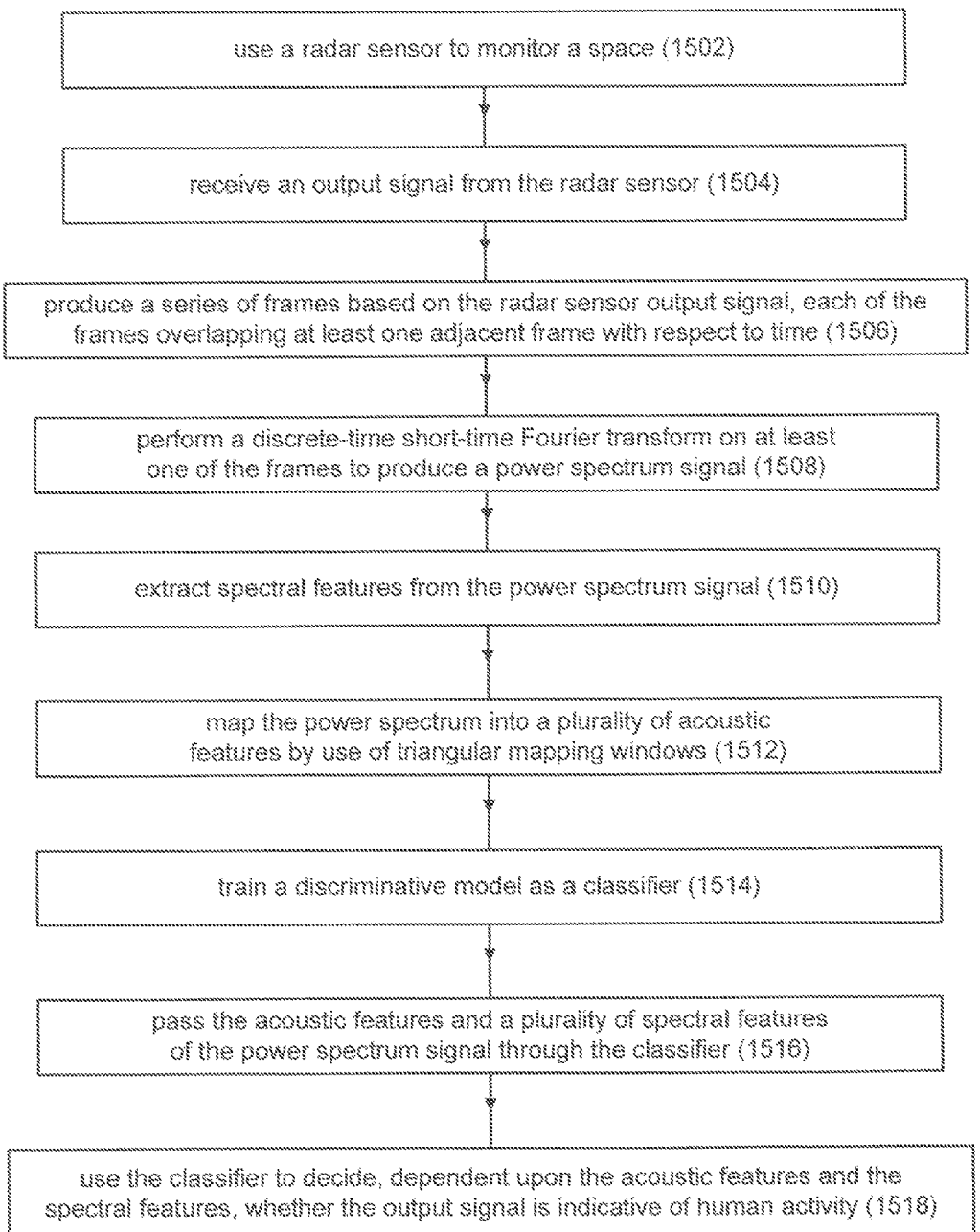
FIG. 15 is a flow chart of one embodiment of a human presence detection method of the present invention.

One embodiment of a method 1500 of the present invention for detecting human activity is illustrated in FIG. 15. In a first step 1502, a radar sensor is used to monitor a space. For example, a continuous wave radar sensor or a pulse radar sensor may be used to monitor a space such as a room of a building.

In a second step 1504, an output signal is received from the radar sensor. That is, the radar sensor may output an electrical signal indicative of what the radar sensor was able to sense within the monitored space. For example, radar sensor device 904 (FIG. 9) may output an electrical signal that is received by analyzer sub-system 902.

Next, in step 1506, a series of frames is produced based on the radar sensor output signal. Each of the frames overlaps at least one adjacent frame with respect to time. For example, the time domain radar sensor output signal of FIG. 3a may be divided into overlapping time windows (i.e., "frames"). In one embodiment, the time length of overlap between two adjacent frames is about one-half the duration of a frame. Thus, each point in time is covered by two overlapping frames.

In step 1508 a discrete-time short-time Fourier transform is performed on at least one of the frames to produce a signal spectrum. For example, the plot of FIG. 3c may be obtained by performing short-time Fourier transforms (STFT) on at least one of the frames of the time domain signal of FIG. 3a.

In a next step 1510, spectral features are extracted from the signal spectrum. For example, spectral features such as spectral flux, spectral flatness, normalized energy, spectral centroid, spectral kurtosis, and spectral bandwidth may be extracted from the signal spectrum of FIG. 3c.

Next, in step 1512, the power spectrum is mapped into a plurality of acoustic features by use of triangular mapping filters. For example, the triangular mapping filters of FIG. 5 may be applied to the signal spectrum of FIG. 3c to thereby determine an amount of energy in each frequency band $m_i$. The amount of energy in each band may represent a respective acoustic feature.

In step 1514, a discriminative model is trained as a classifier. As described hereinabove, a multi-layer perceptron neural network and/or a support vector machine may be trained as a classifier.

In a next step 1516, the acoustic features and a plurality of spectral features of the signal spectrum are passed through the classifier. That is, the acoustic features described with reference to step 1512 and the spectral features described with reference to step 1510 may be fed into the multi-layer perceptron neural network and/or support vector machine that has been trained as a classifier.

In a final step 1518, the classifier is used to decide, dependent upon the acoustic features and the spectral features, whether the output signal is indicative of human activity. For example, the trained classifier may decide whether there is a human present or not based upon the acoustic features and the spectral features that are fed into the classifier.

While this invention has been described as having an exemplary design, the present invention may be further modified within the spirit and scope of this disclosure. This application is therefore intended to cover any variations, uses, or adaptations of the invention using its general principles.

What is claimed is:

1. A method of detecting human presence, said method comprising the steps of:
   using a radar sensor to monitor a space;
   receiving an output signal from the radar sensor;

performing a Fourier transform on the output signal to produce a frequency domain signal spectrum;

transforming the frequency domain signal spectrum into an acoustic domain signal; and deciding whether the output signal is indicative of human activity, the deciding being dependent upon:
at least one feature of the acoustic domain signal; and
at least one spectral feature of the signal spectrum.

2. The method of claim 1 comprising the further step of using the radar sensor output signal to produce a series of frames, each of the frames overlapping at least one adjacent said frame with respect to time, the Fourier transform comprising a short-time Fourier transform that is performed on at least one of the frames.

3. The method of claim 1 comprising the further step of mapping a power spectrum signal onto a Mel scale, the at least one acoustic feature resulting from the mapping.

4. The method of claim 3 wherein the mapping step includes applying a plurality of triangular windows to respective frequency bands.

5. The method of claim 1 comprising the further steps of:
training a discriminative model as a classifier;
passing the at least one acoustic feature and the at least one spectral feature of the signal spectrum through the classifier; and
using the classifier to decide whether the output signal is indicative of human activity.

6. The method of claim 5 wherein the discriminative model comprises at least one of a multi-layer perceptron neural network and a support vector machine.

7. The method of claim 1 wherein the acoustic features comprise quantities of energy in respective frequency bands.

8. A method of detecting human presence, said method comprising the steps of:
using a radar sensor to monitor a space;
receiving an output signal from the radar sensor;
performing a Fourier transform on the output signal to produce a frequency domain signal spectrum;
transforming the frequency domain signal spectrum into an acoustic domain signal;
extracting a plurality of features from the acoustic domain signal;
passing the features through a classifier; and
using the classifier to decide whether the output signal is indicative of human activity, the deciding being dependent upon at least one of the features of the acoustic domain signal.

9. The method of claim 8 comprising the further step of using the radar sensor output signal to produce a series of frames, each of the frames overlapping at least one adjacent said frame with respect to time, the Fourier transform comprising a short-time Fourier transform that is performed on at least one of the frames.

10. The method of claim 8 comprising the further step of mapping the frequency domain spectrum signal onto a Mel scale, at least one said feature resulting from the mapping.

11. The method of claim 10 wherein the mapping step includes applying a plurality of triangular windows to respective frequency bands.

12. The method of claim 8 comprising the further step of training a discriminative model as said classifier.

13. The method of claim 8 wherein the transforming step includes mapping the frequency domain signal spectrum by use of triangular mapping filters.

14. A method of detecting human presence, said method comprising the steps of:
using a radar sensor to monitor a space;
receiving an output signal from the radar sensor;
producing a series of frames based on the radar sensor output signal, each of the frames overlapping at least one adjacent said frame with respect to time;
performing a discrete-time short-time Fourier transform on at least one of the frames to produce a signal spectrum;
mapping the power spectrum of the radar sensor output signal into a plurality of acoustic features by use of triangular mapping windows;
training a discriminative model as a classifier;
passing the acoustic features and a plurality of spectral features of the signal spectrum through the classifier; and
using the classifier to decide whether the output signal is indicative of human activity.

15. The method of claim 14 comprising the further step of extracting the spectral features from the signal spectrum.

16. The method of claim 14 wherein the classifier decides, dependent upon the acoustic features and the spectral features, whether the output signal is indicative of human activity.

17. The method of claim 14 wherein the discriminative model comprises at least one of a multi-layer perceptron neural network and a support vector machine.

18. The method of claim 14 wherein the radar sensor comprises a continuous wave radar sensor.

19. A method of detecting human presence, said method comprising the steps of:
using a radar sensor to monitor a space;
receiving an output signal from the radar sensor;
translating the output signal into acoustic levels by modifying a sampling rate of the output signal;
extracting a set of unique features related to motion activities from the output signal in an acoustic domain;
passing the features through the classifier; and
using the classifier to decide whether the output signal is indicative of human activity.

20. The method of claim 19 wherein the unique features related to motion activities from the output signal in an acoustic domain comprise first features, the method comprising the further step of extracting a set of unique second features related to motion activities from the output signal in a spectral frequency domain.

* * * * *